United States Patent
Hsu

(10) Patent No.: US 11,709,656 B2
(45) Date of Patent: Jul. 25, 2023

(54) SHORT CHANNEL EFFECT BASED RANDOM BIT GENERATOR

(71) Applicant: eMemory Technology Inc., Hsin-Chu (TW)

(72) Inventor: Ching-Hsiang Hsu, Hsinchu County (TW)

(73) Assignee: eMemory Technology Inc., Hsin-Chu (TW)

( * ) Notice: Subject to any disclaimer, the term of this patent is extended or adjusted under 35 U.S.C. 154(b) by 1071 days.

(21) Appl. No.: 16/373,599

(22) Filed: Apr. 2, 2019

(65) Prior Publication Data
US 2020/0019379 A1 Jan. 16, 2020

Related U.S. Application Data

(60) Provisional application No. 62/697,411, filed on Jul. 13, 2018.

(51) Int. Cl.
*G06F 7/58* (2006.01)
*G11C 11/412* (2006.01)
(Continued)

(52) U.S. Cl.
CPC ............ *G06F 7/588* (2013.01); *G11C 11/412* (2013.01); *G11C 11/419* (2013.01);
(Continued)

(58) Field of Classification Search
CPC . G06F 7/58; G06F 7/582; G06F 7/588; G11C 11/412; G11C 11/417; G11C 11/419; H03K 3/027; H03K 3/037; H03K 3/84
See application file for complete search history.

(56) References Cited

U.S. PATENT DOCUMENTS

| 7,174,355 B2 | 2/2007 | Henry |
| RE40,188 E | 3/2008 | Lofstrom |

(Continued)

FOREIGN PATENT DOCUMENTS

| CN | 1514346 A | 7/2004 |
| JP | 2001-358237 A | 12/2001 |

(Continued)

OTHER PUBLICATIONS

Mohd Syafiq Mispan et al., TCO-PUF: A Subthreshold Physical Unclonable Function, pp. 105-108, IEEE 2015, XP033200762.

(Continued)

*Primary Examiner* — Long Nguyen
(74) *Attorney, Agent, or Firm* — Winston Hsu

(57) ABSTRACT

A random bit generator includes a voltage source, a bit data cell, and a sensing control circuit. The voltage source provides a scan voltage during enroll operations. The data cell includes a first transistor and a second transistor. The first transistor has a first terminal coupled to a first bit line, a second terminal coupled to the voltage source, and a control terminal. The second transistor has a first terminal coupled to a second bit line, a second terminal coupled to the voltage source, and a control terminal. The sensing control circuit is coupled to the first bit line and the second bit line, and outputs a random bit data according to currents generated through the first transistor and the second transistor during an enroll operation of the bit data cell.

8 Claims, 5 Drawing Sheets

(51) Int. Cl.
  *G11C 11/419* (2006.01)
  *H01L 27/088* (2006.01)
  *H03K 3/037* (2006.01)
  *H03K 3/84* (2006.01)

(52) U.S. Cl.
  CPC .......... *H01L 27/088* (2013.01); *H03K 3/037* (2013.01); *H03K 3/84* (2013.01)

(56) References Cited

U.S. PATENT DOCUMENTS

| | | |
|---|---|---|
| 8,566,377 B2 | 10/2013 | Harris |
| 8,583,710 B2 | 11/2013 | Bucci |
| 9,640,247 B2 | 5/2017 | Chen |
| 9,741,446 B2 | 8/2017 | Liao |
| 2003/0135527 A1 | 7/2003 | Lundberg |
| 2006/0187706 A1 | 8/2006 | Tang |
| 2016/0285639 A1* | 9/2016 | Mathew ................ G06Q 10/08 |
| 2017/0373015 A1 | 12/2017 | Yano |
| 2019/0339941 A1* | 11/2019 | Wang .................... G06F 7/588 |

FOREIGN PATENT DOCUMENTS

| | | |
|---|---|---|
| JP | 2011-521376 A | 7/2011 |
| JP | 2014-21530 A | 2/2014 |
| JP | 2017-41295 A | 2/2017 |
| JP | 2018-507468 A | 3/2018 |
| TW | 554285 | 9/2003 |
| TW | 201709203 A | 3/2017 |

OTHER PUBLICATIONS

Vikram Belur Suresh, University of Massachusetts Amherst, On-Chip True Random Number Generation in Nanometer Cmos, Feb. 2012, XP55609857.

Hao-Ting Shen et al., Selective Enhancement of Randomness at the Materials Level: Poly-Si Based Physical Unclonable Functions (PUFs), 2016 IEEE Computer Society Annual Symposium on VLSI, pp. 188-193, XP032958183.

* cited by examiner

SHORT CHANNEL EFFECT BASED RANDOM BIT GENERATOR

CROSS REFERENCE TO RELATED APPLICATIONS

This non-provisional application claims priority of U.S. provisional application No. 62/697,411, filed on Jul. 13, 2018, included herein by reference in its entirety.

BACKGROUND OF THE INVENTION

1. Field of the Invention

The present invention is related to a random bit generator, and more particularly, to a short channel effect based random bit generator.

2. Description of the Prior Art

As electronic devices are applied to more and more fields, information security between electronic devices and within electronic devices has raised great concerns. Since reverse engineering has become automatable on chips and devices, physical and side-channel attacks have become much more affordable and powerful. Therefore, it is more and more difficult to prevent the electronic devices from being accessed by unauthorized personnel.

In prior art, a physical unclonable function (PUF) circuit may be applied to generate random numbers as security keys for protecting the system from physical attacks due to its intrinsic characteristics. However, most of the PUF circuits may generate random bits according to minor variations in circuit performance resulted from characteristic variations of internal transistors caused in the manufacturing process. Since the variations can be very small, these PUF circuits are usually susceptible to environmental conditions, such as the variation of supplied voltage, temperature, noise, electromagnetic wave, etc., resulting in the instability of the random numbers generated. In addition, since the generating process of random numbers can substantially change the structures of the internal transistors in many cases, the PUF circuits may suffer degradation due to aging, or the generated random numbers may be traced by analyzing the structural changes.

SUMMARY OF THE INVENTION

One embodiment of the present invention discloses a random bit generator. The random bit generator includes a voltage source, a bit data cell, and a sensing control circuit.

The voltage source provides a scan voltage during enroll operations. The data cell includes a first transistor and a second transistor. The first transistor has a first terminal coupled to a first bit line, a second terminal coupled to the voltage source, and a control terminal. The second transistor has a first terminal coupled to a second bit line, a second terminal coupled to the voltage source, and a control terminal. The sensing control circuit is coupled to the first bit line and the second bit line, and outputs a random bit according to currents generated through the first transistor and the second transistor during an enroll operation of the bit data cell.

Another embodiment of the present invention discloses a random number generator. The random number generator includes a voltage source, a first select circuit, a second select circuit, a plurality of bit data cells, and a sensing control circuit.

The voltage source provides a scan voltage during enroll operations. The first select circuit is coupled to a first main bit line and a second main bit line. The second select circuit is coupled to the voltage source. Each of the plurality of bit data cells includes a first transistor and a second transistor. The first transistor has a first terminal coupled to the first select circuit, a second terminal coupled to the second select circuit, and a control terminal. The second transistor has a first terminal coupled to the first select circuit, a second terminal coupled to the second select circuit, and a control terminal. The sensing control circuit is coupled to the first select circuit through the first main bit line and the second main bit line.

During an enroll operation of a first bit data cell of the plurality of bit data cells, the first select circuit forms an electrical connection between the first main bit line and the first bit data cell, and forms an electrical connection between the second main bit line and the first bit data cell, the second select circuit forms electrical connections between the voltage source and the first bit data cell, and the sensing control circuit outputs a random bit according to currents on the first main bit line the second main bit line.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
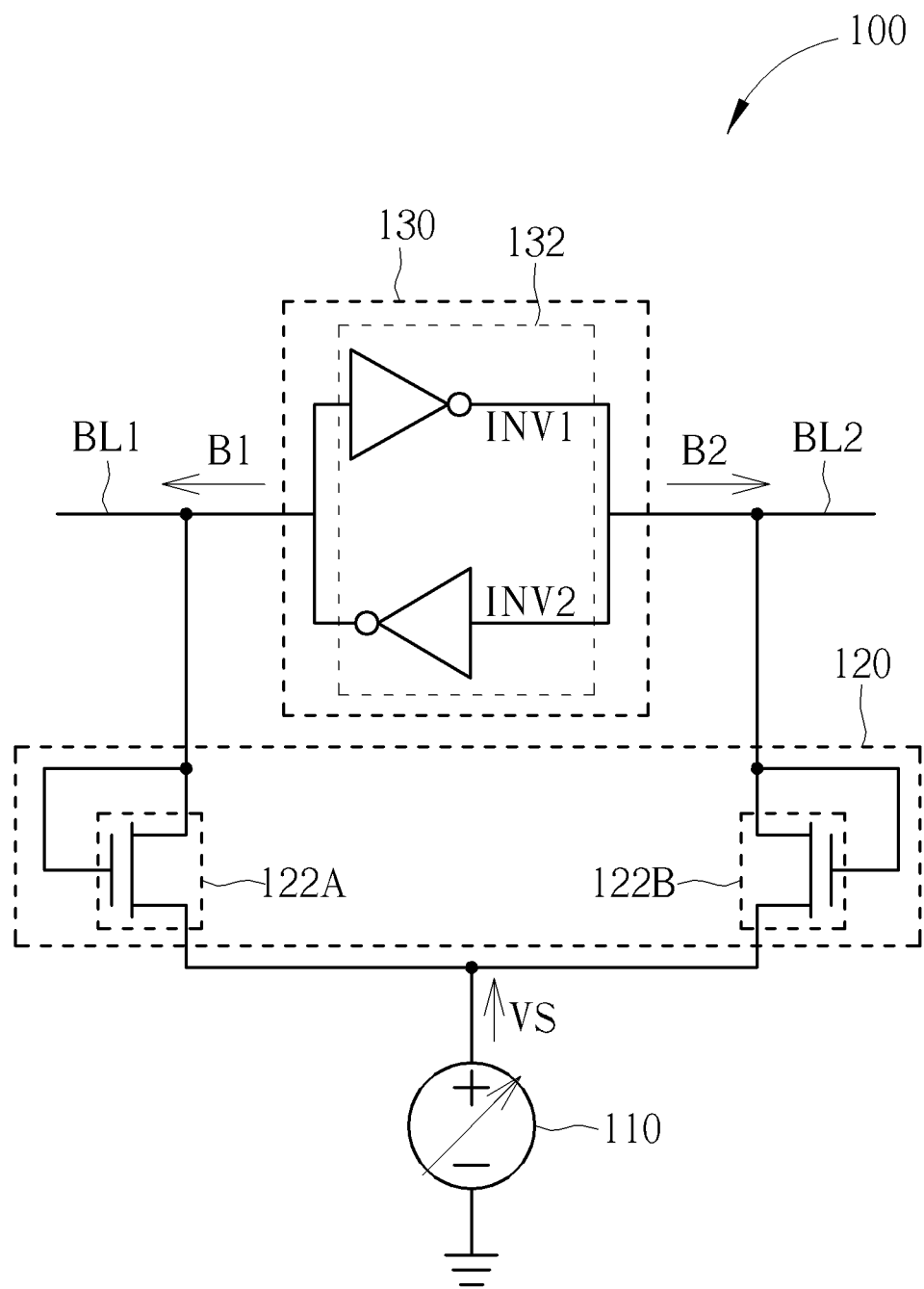
FIG. 1 shows a random bit generator according to one embodiment of the present invention.

FIG. 1 shows a random bit generator 100 according to one embodiment of the present invention. The random bit generator 100 includes a voltage source 110, a bit data cell 120, and a sensing control circuit 130.

The bit data cell 120 includes a first transistor 122A and a second transistor 122B. In FIG. 1, the first transistor 122A and the second transistor 122B are N-type transistors. The first transistor 122A has a first terminal coupled to a first bit line BL1, a second terminal coupled to the voltage source 110, and a control terminal coupled to the first terminal of the first transistor 122A. The second transistor 122B has a first terminal coupled to a second bit line BL2, a second terminal coupled to the voltage source 110, and a control terminal coupled to the first terminal of the second transistor 122B. Also, the sensing control circuit 130 can be coupled to the first bit line BL1 and the second bit line BL2.

In some embodiments, the first transistor 122A and the second transistor 122B may be designed to have the same size. However, due to the process variations caused in, for example but not limited to, the lithographic process and/or the etching patterning process, the actual channel lengths of the first transistor 122A and the second transistor 122B will not be exactly the same. That is, the channel length variation is inevitable, and even if the two transistors 122A and 122B are geographically adjacent to each other, the channel length variation will still exist.

Figure 2:
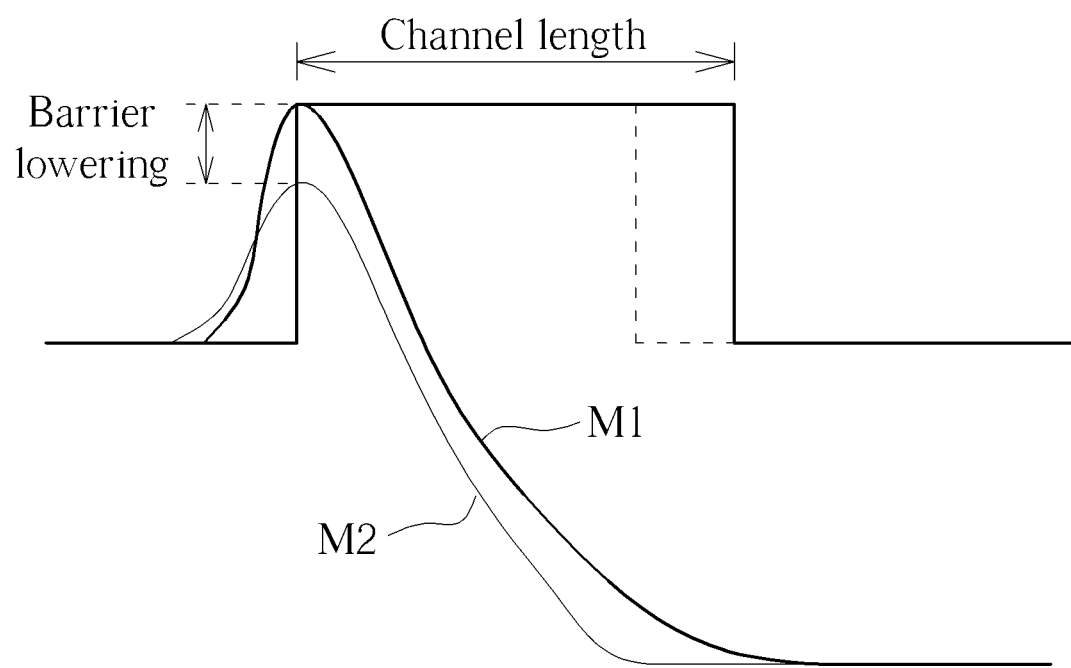
FIG. 2 shows the energy band diagram along the channels of two transistors.

Since the channel lengths of the first transistor 122A and the second transistor 122B can be different, the voltages required to lower the barriers and to induce the punch through currents for these two transistors 122A and 122B will also be different. FIG. 2 shows the energy band diagram along the channels of the two transistors M1 and M2. In FIG. 2, the same voltage is applied to the two transistors M1 and M2, while the channel length of the transistor M1 is longer than the channel length of the transistor M2. In this case, the drain induced barrier lowering on the transistor M2 is more obvious than the drain induced barrier lowering on the transistor M1. Namely, comparing to the transistor M1, the transistor M2 will induce the punch through current with a lower drain voltage. Therefore, when the drain voltage reaches to a specific level, the transistor M2 may start to induce the punch through current while the transistor M1 may not.

Also, since the punch through current is exponentially proportional to the barrier lowering, the phenomenon can be observed easily even though the channel length variation may seem small.

To induce the punch through current and record the difference between the transistors 122A and 122B, that is to enroll the random bit, the voltage source 110 can provide a scan voltage VS to induce the punch through current on one of the transistors 122A and 122B, and the sensing control circuit 130 will output and store the random bit according to the currents generated by the transistors 122A and 122B.

In some embodiments of the present invention, during the enroll operation of the bit data cell 120, the scan voltage VS will start to increase from a default voltage. The default voltage can be, for example but not limited to, a reference voltage in the system or the ground voltage. As the scan voltage VS increases, the transistor with a shorter channel length will be punched through and start to generate currents. For example, if the first transistor 122A has a shorter channel length, the first transistor 122A will start to generate a current first, and the first bit line BL1 will be charged. As the voltage level at the first bit line BL1 increases, the sensing control circuit 130 will output and store the data bits accordingly.

For example, in FIG. 1, the sensing control circuit 130 can include a latch 132. The latch 132 has a first data terminal coupled to the first bit line BL1, and a second data terminal coupled to the second bit line BL2. In this case, when the voltage level at the first bit line BL1 increases, the latch 132 will be triggered, raising the voltage level at the first data terminal to a high voltage and keeping the voltage level at the second data terminal to a low voltage. Once the first data terminal of the latch 132 reaches the high voltage and the second data terminal of the latch 132 remains at the low voltage, the latch 132 will enter to a stable mode, and the voltage level will be preserved. Therefore, the first bit line BL1 will be at the high voltage, representing the random bit B1 as "1" (for example but not limited to), and the second bit line BL2 will be at the low voltage, representing the random bit B2 as "0" (for example but not limited to). That is, the latch 132 can output and store the random bit B1 and the random bit B2 complementary to the random bit B1 through the first data terminal and the second data terminal of the latch 132 according to voltages at the first data terminal and the second data terminal of the latch 132 respectively. In some embodiments, the random bits B1 and B2 can be outputted as a differential pair, however, in some other embodiments, only one of the random bits B1 and B2 will be outputted and used.

In FIG. 1, the latch 132 can include a first inverter INV1 and a second inverter INV2. The first inverter INV1 has an input terminal coupled to the first data terminal of the latch 132, and an output terminal coupled to the second data terminal of the latch 132. The second inverter INV2 has an input terminal coupled to the second data terminal of the latch 132, and an output terminal coupled to the first data terminal of the latch 132. However, in some other embodiments, the latch 132 may be implemented by different structures.

Also, during the enroll operation, the scan voltage VS will stop increasing when the sensing control circuit 130 outputs the first data bit B1, preventing the other transistor from being punched through and generating a current.

Since the variations of the channel length is unpredictable and uncontrollable, the random bit generated by the random bit generator 100 according to the intrinsic characteristics residing in transistors 122A and 122B would be very suitable for security applications. Furthermore, the voltage required to induce the punch through currents is smaller than the rupture voltage of the first transistor 122A and the rupture voltage of the second transistor 122B. For example, the rupture voltages of the transistors 122A and 122B may be greater than 10V while the voltage for inducing the punch through currents may be 1.6V in some embodiments. Due to the lower operation voltage, the enroll operation can be performed repeatedly as power is turned on and off without damaging the structure of the first transistor 122A and the second transistor 122B.

Also, in the present embodiment, since the random bits B1 and B2 are stored in the latch 132, which is similar to an SRAM cell, the random bits B1 and B2 will be lost when the power is turned off. However, since the variation of channel length is not subject to the ambient conditions, the generated random bits can be very stable and repeatable. That is, the same values of the random bits B1 and B2 can be regenerated when the power is turned on again. Also, to ensure the random bit generator 100 can regenerate the same random bits B1 and B2, the latch 132 can be reset every time before the enroll operations, preventing the values of the random bits B1 and B2 from being affected by unknown circuit states. With the characteristic of generation on-demand, the random bits can be even more difficult to trace, and, thus, the safety can be further improved.

In FIG. 1, the control terminal of the first transistor 122A can be coupled to the first terminal of the first transistor 122A, and the control terminal of the second transistor 122B can be coupled to the first terminal of the second transistor 122B. However, in some other embodiments, the control terminal of the first transistor 122A and the control terminal of the second transistor 122B can also be floating.

In some embodiments, the first transistor 122A and the second transistor 122B can be metal-oxide-semiconductor (MOS) field effect transistors. However, in some other embodiments, the first transistor 122A and the second transistor 122B can be silicon-oxide-nitride-oxide-silicon (SONOS) transistors or oxide-nitride-oxide (ONO) transistors. Furthermore, in FIG. 1, the first transistor 122A and the second transistor 122B are N-type transistors; however, in some other embodiments, the first transistor 122A and the second transistor 122B can be P-type transistors.

Figure 3:
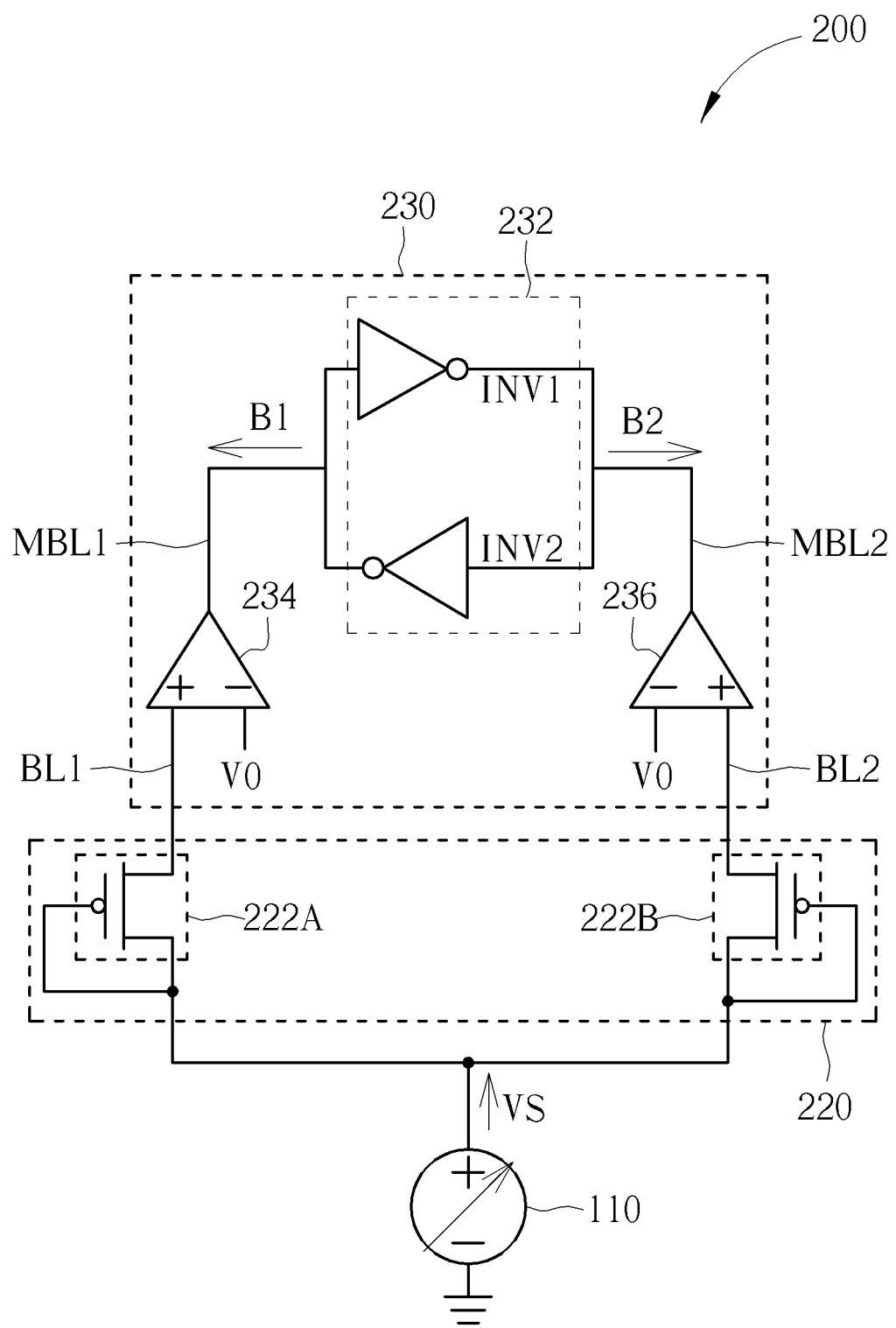
FIG. 3 shows a random bit generator according to another embodiment of the present invention.

FIG. 3 shows a random bit generator 200 according to another embodiment of the present invention. In FIG. 3, the random bit generators 100 and 200 have similar structures and can be operated with similar principles. However, the first transistor 222A and the second transistor 222B in the data bit cell 220 can be P-type transistors. In this case, the control terminal of the first transistor 222A can be coupled to the second terminal of the first transistor 222A, and the control terminal of the second transistor 222B can be coupled to the second terminal of the second transistor 222B. However, in some embodiments, the control terminals of the first transistor 222A and the second transistor 222B can also be floating according to the system requirement.

Furthermore, in FIG. 3, the sensing control circuit 230 includes a latch 232, a first amplifier 234, and a second amplifier 236. The first amplifier 234 has a first input terminal coupled to the first bit line BL1, a second input terminal for receiving a reference voltage V0, and an output terminal coupled to a first main bit line MBL1. The second amplifier 236 has a first input terminal coupled to the second bit line BL2, a second input terminal for receiving the reference voltage V0, and an output terminal coupled to a second main bit line MBL2.

The latch 232 has a first data terminal coupled to the output terminal of the first amplifier 234 through the first main bit line MBL1, and a second data terminal coupled to the output terminal of the second amplifier 236 through the second main bit line MBL2. In this case, the latch 232 can output and store the random bits B1 and B2 according to voltages at the first data terminal and the second data terminal of the latch 232. With the amplifiers 234 and 236, the voltage change would be even more drastic, and the time required by the enroll operation can be further reduced. However, in some embodiments, if the voltage change is soon enough, the first amplifier 234 and the second amplifier 236 can be omitted as the random bit generator 100.

In FIGS. 1 and 3, the sensing control circuits 130 and 230 can use the latches 132 and 232 to sense the voltage change and store the random bits. However, in some other embodiments, the sensing control circuit may adopt other types of circuit, such as other types of SRAM cells, to sense the voltage change and store the random bits.

Figure 4:
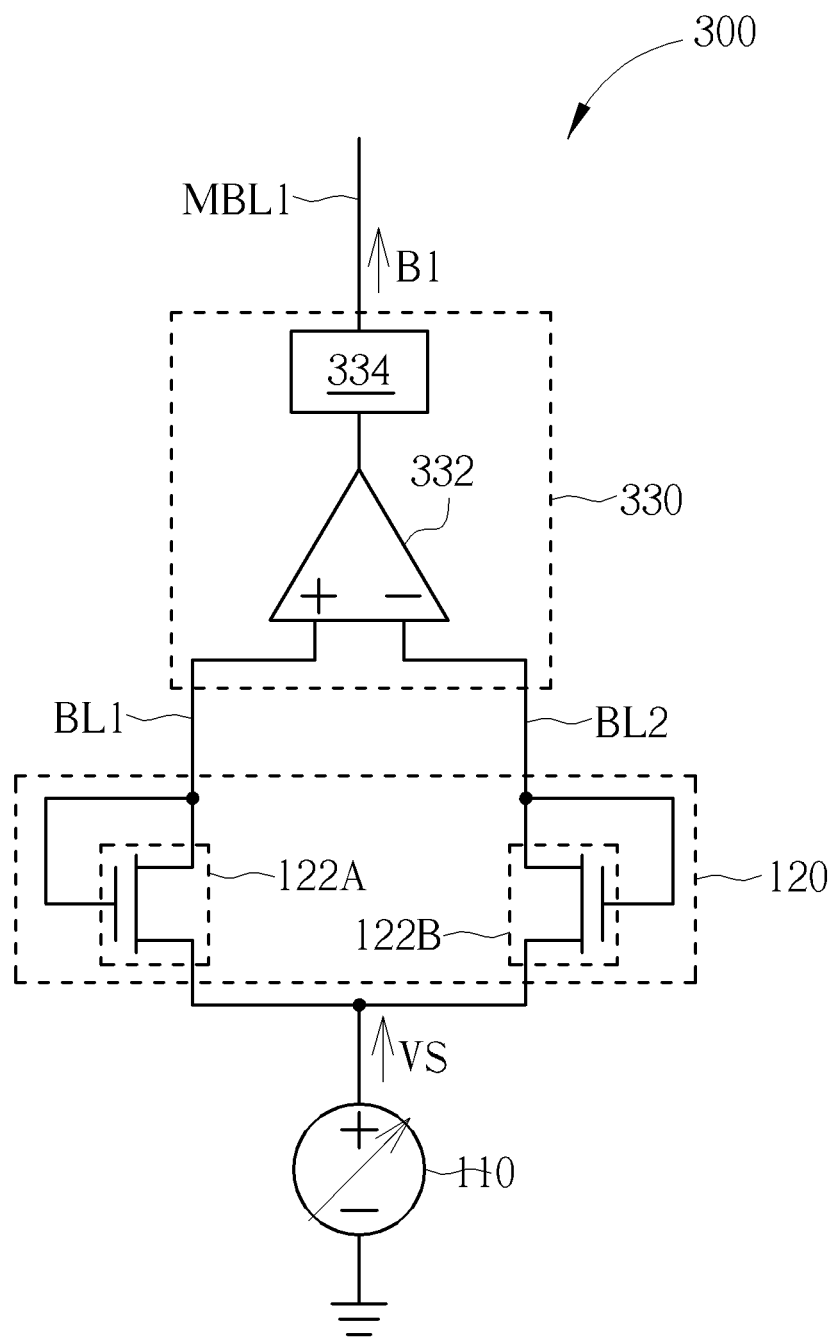
FIG. 4 shows a random bit generator according to another embodiment of the present invention.

FIG. 4 shows a random bit generator 300 according to another embodiment of the present invention. The random bit generators 100 and 300 have similar structures and can be operated with similar principles. However, the sensing control circuit 330 of the random bit generator 300 can include a differential amplifier 332 and an analog to digital converter 334.

The differential amplifier 332 has a first input terminal coupled to the first bit line BL1, a second input terminal coupled to the second bit line BL2, and an output terminal. The analog to digital converter 334 can be coupled to the output terminal of the differential amplifier 332, and can output the random bit B1 through the main bit line MBL1 according to the voltage signal at the output terminal of the differential amplifier 332. That is, the differential amplifier 332 can output a voltage signal according to the voltage differences on the first bit line BL1 and the second bit line BL2, and the analog to digital converter 334 can further convert the voltage signal to a digital signal as "1" or "0" for indicating the random bit B1. In this case, the random bit B1 can be used by the following circuits directly or can be stored in the registers of the system.

In some embodiments, to generate the security key for authentication or to generate the encryption string for data encryption, the system may require a plurality of random bits to provide a desired random number.

Figure 5:
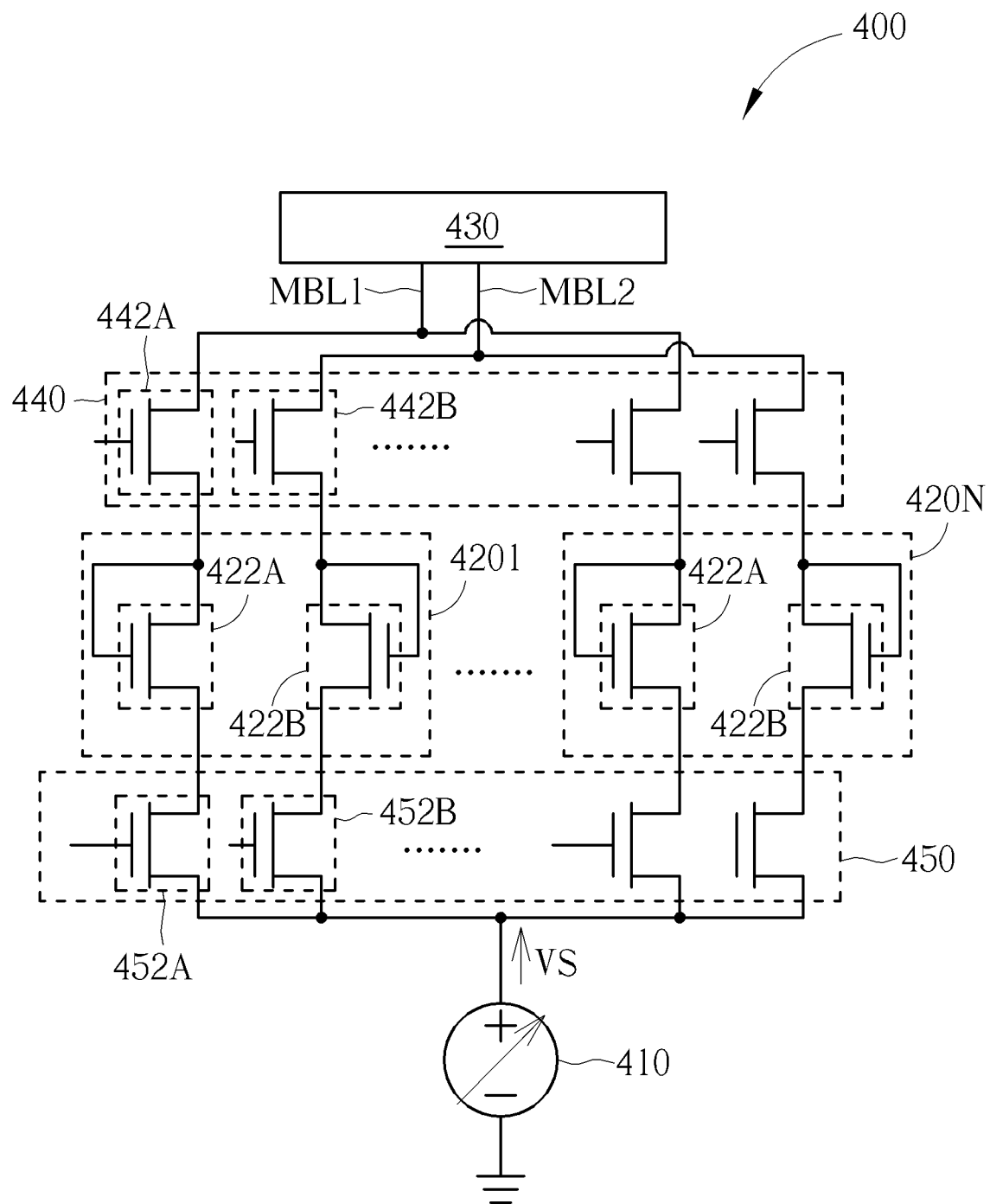
FIG. 5 shows a random number generator according to one embodiment of the present invention.

FIG. 5 shows a random number generator 400 according to one embodiment of the present invention. The random number generator 400 includes a voltage source 410, a plurality of bit data cells 4201 to 420N, a sensing control circuit 430, a first select circuit 440, and a second select circuit 450, where N is a positive integer.

The first select circuit 440 can be coupled to a first main bit line MBL1 and a second main bit line MBL2, and the second select circuit 450 can be coupled to the voltage source 410. Each of the bit data cells 4201 to 420N includes a first transistor 422A and a second transistor 422B. The first transistor 422A has a first terminal coupled to the first select circuit 440, a second terminal coupled to the second select circuit 450, and a control terminal. The second transistor 422B has a first terminal coupled to the first select circuit 440, a second terminal coupled to the second select circuit 450, and a control terminal. The sensing control circuit 430 can be coupled to the first select circuit 440 through the first main bit line MBL1 and the second main bit line MBL2.

In this case, the first select circuit 440 and the second select circuit 450 can be used to select the bit data cell to be enrolled. For example, during an enroll operation of a first bit data cell 4201 of the plurality of bit data cells 4201 to 420N, the second select circuit 450 can form electrical connections between the voltage source 410 and the first bit data cell 4201. Therefore, the second terminals of the first transistor 422A and the second transistor 422B in the first bit data cell 4201 will receive the increasing scan voltage. Also, the first select circuit 440 can form an electrical connection between the first main bit line MBL1 and the first bit data cell 4201, and can form an electrical connection between the second main bit line MBL2 and the first bit data cell 4201. Therefore, the sensing control circuit 450 can receive the punch through current generated by one of the transistors 422A and 422B in the first bit data cell 4201, and can output the random bit generated by the first bit data cell 4201 according to currents on the first main bit line MBL1 and the second main bit line MBL2.

That is, with the first select circuit 440 and the second select circuit 450, the plurality of bit data cells 4201 to 420N can be enrolled individually by sharing the same voltage source 410 and the same sensing control circuit 430.

In FIG. 5, the first select circuit 440 can include a plurality of switches for controlling the electrical connections between the sensing control circuit 430 and the bit data cells 4201 to 420N. For example, to control the electrical connections between the sensing control circuit 430 and the bit data cell 4201, the first select circuit 440 can include a first switch 442A and a second switch 442B. The first switch 442A can be coupled to the first main bit line MBL1 and a first terminal of the first transistor 422A of the first bit data cell 4201. Also, the second switch 442B can be coupled to the second main bit line MBL2 and a first terminal of the second transistor 422B of the first bit data cell 4201.

Similarly, to control the electrical connections between the voltage source 410 and the bit data cell 4201, the second select circuit 450 can include a first switch 452A and a second switch 452B. The first switch 452A can be coupled to the voltage source 410 and a second terminal of the first transistor 422A of the first bit data cell 4201. The second switch 452B can be coupled to the voltage source 410 and a second terminal of the second transistor 422B of the first bit data cell 4201.

Although in FIG. 5, the bit data cells 4201 to 420N are disposed in a row, and each may be selected to be enrolled easily with one control signal, this is not to limit the scope of the present invention. In some embodiments, the bit data cells 4201 to 420N may be disposed as a memory array, and the first select circuit 440 and the second select circuit 450 may include more switches to build the address decoding control for selecting the desired bit data cell to be enrolled.

With the random number generated by the random number generator 400, the system can generate unique security keys for authentication or encrypt the transmission data for protecting the transmission data, improving the information security of the system. Moreover, since the random number generator 400 can always regenerate the same random number with the same bit data cells 4201 to 420N, the random number can be stored in SRAM cells and, thus, the random number would be untraceable when the power is turned off, increasing the difficulty of copying the random number generated by the random number generator 400.

In summary, the random bit generator and the random number generator can generate the random bits according to the variations of punch through currents of the internal transistors caused by channel length variations. Since the variation of channel length is not subject to the ambient conditions, the generated random bits can be very stable and repeatable. Moreover, by storing the random bits in latch circuits, such as SRAM cells, the random bits would be untraceable when the power is turned off, increasing the difficulty of copying the random number and improving the information security.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A random bit generator comprising:
    a bit data cell comprising:
        a first N-type transistor having a first terminal coupled to a first bit line, a second terminal, and a control terminal coupled to the first terminal of the first N-type transistor; and
        a second N-type transistor having a first terminal coupled to a second bit line, a second terminal, and a control terminal coupled to the first terminal of the second N-type transistor;
    a voltage source coupled to the second terminal of the first N-type transistor and the second terminal of the second N-type transistor, and configured to provide a scan voltage during an enroll operation of the bit data cell; and
    a sensing control circuit coupled to the first bit line and the second bit line, and configured to output a random bit based on a punch through current of-the first N-type transistor or a punch through current of the second N-type transistor;
    wherein the scan voltage provided by the voltage source induces the punch through current of the first N-type transistor or the punch through current of the second N-type transistor.

2. The random bit generator of claim 1, wherein the sensing control circuit comprises a latch having a first data terminal coupled to the first bit line, and a second data terminal coupled to the second bit line, and configured to output and store the random bit according to voltages at the first data terminal and the second data terminal of the latch.

3. The random bit generator of claim 2, wherein the latch comprises:
    a first inverter having an input terminal coupled to the first data terminal of the latch, and an output terminal coupled to the second data terminal of the latch; and
    a second inverter having an input terminal coupled to the second data terminal of the latch, and an output terminal coupled to the first data terminal of the latch.

4. The random bit generator of claim 2, wherein the latch is reset before the enroll operation.

5. The random bit generator of claim 1, wherein the sensing control circuit comprises:
    a differential amplifier having a first input terminal coupled to the first bit line, a second input terminal coupled to the second bit line, and an output terminal; and
    an analog to digital converter coupled to the output terminal of the differential amplifier and configured to output the random bit according to a voltage at the output terminal of the differential amplifier.

6. The random bit generator of claim 1, wherein the first N-type transistor and the second N-type transistor are silicon-oxide-nitride-oxide-silicon (SONOS) transistors, oxide-nitride-oxide (ONO) transistors or metal-oxide-semiconductor (MOS) transistors.

7. The random bit generator of claim 1, wherein during the enroll operation of the bit data cell, the scan voltage starts to increase from a default voltage and stops increasing when the sensing control circuit outputs the random bit.

8. The random bit generator of claim 7, wherein the scan voltage is smaller than a rupture voltage of the first N-type transistor and a rupture voltage of the second N-type transistor.

* * * * *